United States Patent Office

3,419,643
Patented Dec. 31, 1968

3,419,643
PROCESS FOR THE PREPARATION OF PHOSPHONOHALOTHIONATES
Glenn R. Price, Chicago Heights, Ill., assignor to Stauffer Chemical Company, New York, N.Y., a corporation of Delaware
No Drawing. Filed Nov. 5, 1964, Ser. No. 409,310
15 Claims. (Cl. 260—973)

ABSTRACT OF THE DISCLOSURE

A process for the preparation of phosphonohalothionates of the formula:

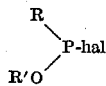

wherein "hal" is a halogen other than fluorine, R is a hydrocarbon which can contain relatively insert substituents such as nitro, halo and cyano atoms, and R' is a lower alkyl. The process comprises reacting a compound of the formula:

wherein R and "hal" are the same as above defined, with a primary or secondary lower aliphatic alcohol in the presence of a sterically hindered heterocyclic tertiary amine such as quinoline or amines having a pyridine nucleus substituted in the alpha position with 1 to 4 carbon alkyl or benzyl.

---

This invention relates to a novel process for the preparation of valuable phosphonohalothionates.

The phosphonohalothionates made by the process of this invention are known compounds which have heretofore been produced by the reaction of a primary or secondary aliphatic alcohol with a phosphonothionic dihalide in the presence of a base according to the following reaction:

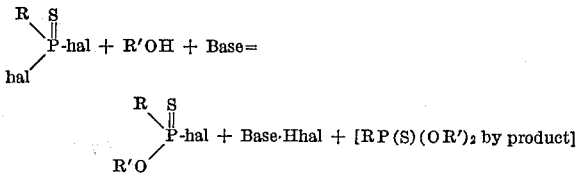

wherein "hal" means halogen, preferably chlorine; and R may be selected from the group consisting of lower alkyl, lower haloalkyl, phenyl, and substituted phenyl, said substituents being selected from nitro, halo, cyano and mixtures thereof, and R' is lower alkyl. The lower alkyl of R and R' are normally those having from 1 to 8 carbon atoms. The bases most commonly used heretofore were the tertiary amines, specifically trimethylamine, triethylamine, pyridine, and the like. The product produced by this prior art process consisted of a mixture containing about 2–9% diester phosphonothionate, and 4–13% unreacted phosphonothionic dihalide with the remainder the desired phosphonohalothionate monoester. Furthermore, the formation of diester could not be eliminated despite the fact that temperatures were varied, reaction times extended and less than stoichiometric amounts of alcohol used. With the prior art amines, the side product diester was already forming even though a large amount of starting material was unreacted which indicated, contrary to expectations, that the diester by product was not the result of running the reaction too long although clearly the diester formation in the reaction mixture resulted from the conversion of the desired monoester into the diester. Consequently, by the prior art process it was impossible to obtain the monoester product in high yield, and hence, such process necessarily required as a final step, fractional distillation. Since the reactants and products boil at temperatures very close to one another, the monoester product could not be separated by simple distillation. A further disadvantage was the relatively long reaction time required by this process. For example, at 30° C. after 21.5 hours of reaction time, there was still present 12.9% of the original phosphonothionic dihalide starting material when triethylamine was used as the base.

An object of this invention is to furnish a process for producing monoester phosphonohalothionates in high yields.

A further object is to provide an process for producing monoester phosphonohalothionates of high purity.

It is also an object of this invention to provide a process for producing monoester phosphonohalothionates in less time.

Other objects will be apparent from the description which follows.

I have now discovered that substantially pure monoester phosphonohalothionates can be produced in high yields and in less time, when the prior art aliphatic alcohol and phosphonothionic dihalide starting materials are reacted in the presence of a sterically hindered heterocyclic tertiary amine selected from the group consisting of quinoline and amines having a pyridine nucleus which is substituted in the alpha position with a substituent selected from the group consisting of 1 to 4 carbon alkyl and benzyl. By this process, the phosphonothionic dihalide starting material is almost completely reacted to form a substantially pure monoester product that requires only filtering or washing. Therefore the need for fractional distillation to separate the monoesters from the reaction mixture has been eliminated. In addition, the reaction times of 21 to 23 hours with only 85 to 90% yield of monoester, which were commonplace with prior art amines may now be reduced to as low as 30 minutes with nearly 100% yield of monoester when one of the preferred amines of the invention is used.

Among the sterically hindered tertiary amines useful in practicing this invention are alpha picoline, 2,6-lutidine, quinoline, 2,4,6-trimethyl pyridine and 2-ethyl pyridine, etc., but alpha picoline, 2,6-lutidine, and quinoline are preferred.

It appears that substitution in the alpha position of a heterocyclic tertiary amine somehow favors the formation of the desired monoester and inhibits formation of diester. In this regard, when heterocyclic sterically unhindered amines such as pyridine, gamma-picoline, and isoquinoline are used the undesirable diester is formed as a side product. Aromatic amines such as dimethyl and diethyl aniline are also unsuitable as well as aliphatic amines such as trimethyl and triethyl amine.

Reaction of the primary or secondary aliphatic alcohols with the phosphonothionic dihalides according to the process of the invention will take place at any temperature between about 0° C. and 100° C. In most instances, reaction will be somewhat sluggish at temperatures near 0° C. At temperatures between about 20° C. and 65° C. the reaction is sufficiently fast for most commercial purposes and hence, this temperature range is deemed to be preferable for the practice of the present invention.

Although no solvent is necessary for reaction of the alcohols with phosphonothionic dihalide, we prefer to use an organic solvent which is inert to the reactants, such as methylene chloride, acetone, acetonitrile, trichloromethane, benzene, and the like. As will be explained in greater detail hereinafter, the rate of reaction may be influenced somewhat by the dielectric constant of the specific solvent used.

The preferred phosphonohalothionates made by this invention are O-isopropyl chloromethylphosphonochloridothionate and O-ethyl ethylphosphonochloridothionate which are the principal starting materials for some economically important pesticides (see, e.g., U.S. Patent No. 2,988,474). Preparation of such pesticides involves reacting the phosphonochloridothionate intermediate with an appropriate thiol in the presence of a hydrogen halide acceptor. The specific procedure for the preparation of one of these pesticides follows:

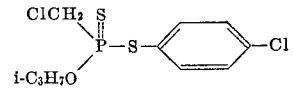

Fifty cc. of benzene, 31.2 grams of O-isopropyl chloromethylphosphonochloridothionate and 22.0 grams of p-chlorophenyl mercaptan were placed in a reaction flask and a solution of 15.4 grams of triethyl amine in benzene was slowly added while maintaining the temperature at 30° C. Following the addition of triethyl amine, the contents of the flask were heated at 40° C.–42°C. for 40 minutes. The product was then washed, concentrated, filtered and found to consist of 42.2 grams of O-isopropyl-S-(p-chlorophenyl)-chloromethylphosphonodithioate.

The following specific examples are furnished to illustrate the principles and operation of the process of the invention, but should not be construed as limiting the broader aspects thereof. Percentages are by weight unless otherwise indicated.

EXAMPLE 1

To a reactor flask containing 91.7 g. (0.50 mol) chloromethylphosphonothionic dichloride and 150 ml. benzene was added a mixture of 47.0 grams (0.50 mol) of alpha picoline and 30.0 grams (0.50 mol) of isopropanol. The flask was placed in a constant temperature bath and the mixture was stirred while the temperature was maintained at 30° C. Vapor phase chromatographs (VPC) were run on aliquots and the following approximate results were found.

| liquots | Reaction time (hrs.) | Reaction-product composition* | | |
|---|---|---|---|---|
| | | $ClCH_2P(Cl)_2$ (percent) | $ClCH_2P\overset{S}{\underset{OC_3H_7\text{-}i}{\overset{\|}{\diagup}}}\overset{Cl}{\diagdown}$ (percent) | $ClCH_2\overset{S}{\overset{\|}{P}}(OC_3H_7\text{-}i)_2$ (percent) |
| 1 | 0.76 | 7.0 | 93.0 | 0.0 |
| 2 | 2.04 | 3.1 | 96.9 | 0.0 |
| 3 | 4.00 | 0.7 | 99.3 | 0.0 |
| 4 | 5.08 | 0.2 | 99.8 | 0.0 |

*The amount of unreacted alcohol is disregarded in the foregoing table and in the examples which follow.

EXAMPLE 2

The procedure of Example 1 was repeated six times, with the same reactants, substituting various other sterically hindered amines as well as unhindered amines. The results are shown in the following table:

| Amine base | Reaction time (hrs.) | Reaction-product composition | | |
|---|---|---|---|---|
| | | $\underset{\text{(Percent)}}{\text{ClCH}_2\overset{\overset{\text{S}}{\|}}{\text{P}}(\text{Cl})_2}$ | $\underset{\text{(Percent)}}{\text{ClCH}_2\overset{\overset{\text{S}}{\|}}{\text{P}}\!\!\diagup\!\!\overset{\text{Cl}}{\diagdown\text{OC}_3\text{H}_7\text{-}i}}$ | $\underset{\text{(Percent)}}{\text{ClCH}_2\overset{\overset{\text{S}}{\|}}{\text{P}}(\text{OC}_3\text{H}_7\text{-}i)_2}$ |
| (alpha picoline) (from Example 1) | 5.08 | 0.2 | 99.8 | 0.0 |
| (2,6 lutidine) | 21.5 | 0.9 | 99.1 | 0.0 |
| (quinoline) | 22.3 | 1.2 | 98.8 | 0.0 |
| (pyridine) | 11.1 | 4.3 | 87.4 | 8.3 |
| | 22.8 | 0 | 91.3 | 8.7 |
| (gamma picoline) | 0.6 | 4.6 | 92.8 | 2.6 |
| (iso quinoline) | 22.8 | 4.9 | 90.7 | 5.4 |
| (triethyl amine) (C$_2$H$_5$)$_3$N | 21.5 | 12.9 | 85.2 | 1.9 |

From the above table it can be seen that with the preferred alpha picoline, 2,6-lutidine, or quinoline as the base no diester was found even though the phosphonothionic dichloride starting material was almost completely reacted. When the sterically unhindered amines were used, however, diester was formed although there was a substantial amount of unreacted phosphonothionic dichloride starting material. It should be noted that alpha picoline and gamma picoline accelerate the reaction much more than the other amines, and thus the reason for the shorter reaction times shown in the table (gamma picoline, however, did not inhibit the formation of the diester).

EXAMPLE 3

The procedure of Example 1 was repeated with the same reactants at a temperature of 50° C. again using alpha picoline as the amine. The reaction was so rapid that it was 95% complete in ten minutes and 100% complete in 30 minutes with an essentially pure monoester produced. The reaction product was cooled to room temperature, filtered and washed with water several times and found to have an index of refraction $n_D^{25}=1.5038$. The product was then distilled by simple distillation and the distillate found to have an index of refraction $n_D^{25}=1.5042$.

EXAMPLE 4

To a reactor flask containing 105.5 grams (0.50 mol) phenylphosphonothionic dichloride and 150 ml. benzene was added 42.5 grams (0.50 mol) of isopropanol and 30.0 grams (0.50 mol) of alpha picoline. The flask was placed in a constant temperature bath and the mixture was stirred while the temperature was held at 30° C. Vapor phase chromatographs were run on aliquots taken during reaction and the following results were found:

| Aliquots | Reaction time (hrs.) | Reaction-product composition | | |
|---|---|---|---|---|
| | | ⌬—P(Cl)$_2$ S (Percent) | ⌬—P(S)(OC$_3$H$_7$-i)(Cl) (Percent) | ⌬—P(S)(OC$_3$H$_7$-i)$_2$ (Percent) |
| 1 | 0.17 | 25.2 | 74.8 | 0.0 |
| 2 | 0.30 | 15.6 | 84.4 | 0.0 |
| 3 | 1.00 | 10.2 | 89.8 | 0.0 |
| 4 | 2.80 | 4.2 | 95.8 | 0.0 |

EXAMPLE 5

The procedure of Example 4 was repeated with the same reactants substituting 2,6 lutidine for alpha picoline and for purposes of comparison the reaction was repeated with gamma-picoline as the base. The results are shown in the following table.

| Amine base | Reaction time (hrs.) | ⌬—P(Cl)$_2$ S (Percent) | ⌬—P(S)(OC$_3$H$_7$-i)(Cl) (Percent) | ⌬—P(S)(OC$_3$H$_7$-i)$_2$ (Percent) |
|---|---|---|---|---|
| 2,6 lutidine | 19.58 | 5.5 | 93.9 | 0.6 |
| gamma-picoline | 3.0 | 15.0 | 78.6 | 6.4 |

From the above example it can be seen that 2,6-lutidine while requiring more reaction time than gamma picoline, does inhibit the formation of the diester. The formation of the minor amount of diester when 2,6 lutidine was used is believed due to the unstable nature of the phenyl phosphonothionic dichloride starting material.

The following compounds were prepared substantially as shown in Example 1, and the index of refraction found after simple distillation is given first and compared to the index of refraction obtained on products which were fractionally distilled and found by vapor phase chromatography to be essentially pure.

EXAMPLE 6

O-methyl chloromethyl phosphonochloridothionate having an index of refraction $n_D^{25}=1.5334$ as compared to 1.5330.

EXAMPLE 7

O-ethyl chloromethyl phosphonochloridothionate having an index of refraction $n_D^{25}=1.4908$ as compared to 1.5175.

EXAMPLE 8

O-ethyl ethyl phosphonochloridothionate having an index of refraction $n_D^{25}=4908$ as compared to 1.4911.

EXAMPLE 9

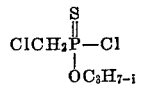

To 91.7 grams (0.5 mol) of chloromethylphosphonothionic dichloride contained in a reactor flask and dissolved in 150 ml. of benzene, was added a mixture of 30.0 grams (0.5 mol) of isopropanol and 47.0 grams (0.5 mol) of alpha picoline over a 30 minute period. The reaction mixture was allowed to warm up to 50° C. during the course of the addition and was heated to maintain the temperature at 50° C. for thirty minutes after the addition was complete. Then the reaction mixture was cooled to room temperature, the solid alpha picoline hydrochloride was removed by filtration and the organic phase was twice washed with 100 ml. portions of cold water. The benzene solvent was removed under partial pressure and the organic phase concentrated to 50° C. at 2.0 mm. of Hg to yield 98.5 grams (95.5%) of O-i-propyl chloromethyl phosphonochloridothionate.

Examples of other known and useful phosphonochloridothionates which may be made by the process of this invention substantially as shown in Example 9 with the substitution of the proper reactants include the following.

EXAMPLE 10

O-butyl phenylphosphonochloridothionate.

EXAMPLE 11

O-isopropyl 4-chlorophenylphosphonochloridothionate.

EXAMPLE 12

O-isopropyl 4-cyanophenylphosphonochloridothionate.

EXAMPLE 13

O-isopropyl 4-nitrophenylphosphonochloridothionate.

EXAMPLE 14

O-octyl chloromethylphosphonochloridothionate.

The following example illustrates the process of the invention when accomplished without a solvent.

EXAMPLE 15

To 91.7 grams (0.5 mol) of chloromethyl phosphonothionic dichloride was added a mixture of 47.0 grams (0.5 mol) of alpha picoline and 30.0 grams of isopropanol allowing the temperature to rise to 60° C. The reaction mixture was heated for an additional thirty minutes to 50–60° C. after the addition was complete and was then cooled to room temperature. In order to faciliate separation, 100 ml. of benzene was added to the reaction mixture followed by 300 ml. of cold water. The organic layer was separated and combined with a single 100 ml. benzene extract of the water layer. The combined organic-benzene solutions were washed twice with 100 ml.

portions of cold water. The benzene was removed under partial pressure and the organic material distilled (B.P. 58° at 2.0 mm. of Hg pressure) to yield 88.0 grams (85.5%) of O-isopropyl chloromethylphosphonochloridothionate having a refractive index $n_D^{25} = 1.5045$.

The following example illustrates the preparation of O-ethyl ethylphosphonochloridothionate in a reaction matrix including acetone as the solvent.

EXAMPLE 16

To a solution of 42.5 grams (0.25 mol) of ethylphosphonothionic dichloride in 100 ml. of acetone was added a mixture of 11.5 grams (0.25 mol) of ethanol and 23.5 grams (0.25 mol) of alpha picoline at 50–60° C. over a one hour period. The reaction mixture was heated to 50° C. for an additional ninety minutes and then cooled to room temperature. The acetone was allowed to evaporate and the reaction mixture was then added to 100 ml. of water. The organic phase was separated and combined with two 50 ml. extractions of the aqueous phase. The combined organic-benzene solution was washed with two 50 ml. portions of water and then the benzene was removed under partial pressure. The remaining organic layer was distilled to yield 34.2 grams (80.5% yield) of O-ethyl ethylphosphonochloridothionate having a refractive index of 1.4908 at 25° C.

As stated hereinabove, there appears to be some correlation between the rate of reaction and the dielectric constant of the organic solvent used in the reaction. More specifically, it has been found that organic solvents which are inert to the reactants and products and which have modestly high dielectric constants tend to accelerate reaction to some extent. While applicant does not wish to be bound by any theory expressed herein, or to any specific solvents set forth hereinafter, the following table summarizes some typical differences in reaction rate observed (in the preparation of O-ethyl ethylphosphonochloridothionate) after one hour of reaction in the indicated solvents.

TABLE I

| Solvent | Dielectric constant ($\epsilon$) | Reaction mixture composition (after 1 hour reaction time) | | |
|---|---|---|---|---|
| | | $\underset{(percent)}{C_2H_5\overset{\overset{S}{\|}}{P}-Cl_2}$ | $\underset{(percent)}{C_2H_5\overset{\overset{S}{\|}}{P}\underset{OC_2H_5}{\diagup Cl}}$ | $\underset{(percent)}{C_2H_5\overset{\overset{S}{\|}}{P}\underset{OC_2H_5}{\diagup OC_2H_5}}$ |
| Benzene | 2.27 | 44.9 | 55.1 | 0.0 |
| Chloroform | 4.8 | 23.2 | 76.8 | 0.0 |
| Methylacetate | 6.68 | 40.7 | 59.3 | 0.0 |
| Methylenechloride | 9.08 | 13.4 | 86.3 | 0.3 |
| Acetone | 20.7 | 7.3 | 92.6 | 0.1 |
| Acetonitrile | 37.5 | 9.6 | 89.5 | 0.9 |

While this invention has been described with respect to certain embodiments, it is to be understood that it is not so limited and that variations and modifications thereof obvious to those skilled in the art can be made without departing from the true spirit or scope thereof.

Having thus described the invention, what is claimed is:

1. A process for the preparation of a substantially pure compound of the formula

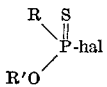

wherein "hal" is chlorine, R is selected from the group consisting of lower alkyl, lower chloroalkyl, phenyl, and substituted phenyl, said substituents being selected from nitro, chlorine, and cyano, and R' is lower alkyl, which comprises reacting a compound of the formula RP(S)(hal)₂ wherein R and "hal" are the same as hereinabove defined, with a compound selected from the group consisting of primary and secondary lower aliphatic alcohols in the presence of a sterically hindered heterocyclic tertiary amine selected from the group consisting of quinoline and amines having a pyridine nucleus which is substituted in the alpha position with a substituent selected from the group consisting of 1 to 4 carbon alkyl and benzyl.

2. The process of claim 1 wherein the reaction temperature is maintained between about 20° C. and 65° C.

3. The process of claim 1 wherein the reaction is accomplished in the presence of an organic solvent selected from the group consisting of methylene chloride, acetone, acetonitrile, trichloromethane, and benzene.

4. A process for the preparation of substantially pure phosphonohalothionate monoesters of the formula

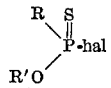

wherein "hal" is chlorine, R is selected from the group consisting of lower alkyl, lower chloroalkyl, phenyl, and substituted phenyl, said substituents being selected from nitro, chlorine, and cyano, and R' is lower alkyl, which comprises reacting a compound of the formula RP(S)(hal)₂ wherein R and "hal" are the same as hereinabove defined, with a compound selected from the group consisting of primary and secondary lower aliphatic alcohols in the presence of alpha picoline.

5. The process of claim 4 wherein the phosphonohalothionate is O-isopropyl chloromethylphosphonochloridothionate, the phosphonothionic dihalide is chloromethylphosphonothionic dichloride and the aliphatic alcohol is isopropanol.

6. The process of claim 4 wherein the phosphonohalothionate is O-ethyl ethylphosphonochloridothionate, the phosphonothionic dihalide is ethylphosphonothionic dichloride and the aliphatic alcohol is ethanol.

7. The process of claim 4 wherein the temperature of the reaction is maintained between about 20° C. and 65° C.

8. A process for the preparation of substantially pure phosphonohalothionate monoesters of the formula

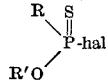

wherein "hal" is chlorine, R is selected from the group consisting of lower alkyl, lower chloroalkyl, phenyl, and substituted phenyl, said substituents being selected from nitro, chlorine, and cyano, and R' is lower alkyl, which comprises reacting a compound of the formula (RP(S)(hal)₂ wherein R and "hal" are the same as hereinabove defined, with a compound selected from the group consisting of primary and secondary lower aliphatic alcohols in the presence of 2,6-lutidine.

9. The process of claim 8 wherein the phosphonohalothionate is O-isopropyl chloromethylphosphonochloridothionate, the phosphonothionic dihalide is chloromethylphosphonothionic dichloride and the aliphatic alcohol is isopropanol.

10. The process of claim 8 wherein the phosphonohalothionate is O-ethyl ethylphosphonochloridothionate, the phosphonothionic dihalide is ethylphosphonothionic dichloride and the aliphatic alcohol is ethanol.

11. The process of claim 8 wherein the temperature of the reaction is maintained between 20° C. and 65° C.

12. A process for the preparation of substantially pure phosphonohalothionate monoesters of the formula

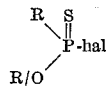

wherein "hal" is chlorine, R is selected from the group consisting of lower alkyl, lower chloroalkyl, phenyl, and substituted phenyl, said substituents being selected from nitro, chlorine, and cyano, and R' is lower alkyl, which comprises reacting a compound of the formula $$RP(S)(hal)_2$$

wherein R and "hal" are the same as hereinabove defined, with a compound selected from the group consisting of primary and secondary lower aliphatic alcohols in the presence of quinoline.

13. The process of claim 12 wherein the phosphonohalothionate is O-isopropyl chloromethylphosphonochloridothionate, the phosphonothionic dihalide is chloromethylphosphonothionic dichloride and the aliphatic alcohol is isopropanol.

14. The process of claim 12 wherein the phosphonohalothionate is O-ethyl ethylphosphonochloridothionate, the phosphonothionic dihalide is ethylphosphonothionic dichloride and the aliphatic alcohol is ethanol.

15. The process of claim 12 wherein the temperature of the reaction is maintained between about 20° C. and 65° C.

References Cited

UNITED STATES PATENTS 3,048,517  8/1962  Chupp _____ 260—973 XR
3,253,062  5/1966  Reetz et al. _____ 260—973 XR CHARLES B. PARKER, *Primary Examiner.*

A. H. SUTTO, *Assistant Examiner.*

U.S. Cl. X.R.

167—30; 260—940, 954, 960, 961

UNITED STATES PATENT OFFICE
CERTIFICATE OF CORRECTION

Patent No. 3,419,643                                          December 31, 1968

Glenn R. Price

It is certified that error appears in the above identified patent and that said Letters Patent are hereby corrected as shown below:

Column 2, line 25, "fractiontal" should read -- fractional --. Columns 3 and 4, in the heading to the table, first column thereof, "liquots" should read -- Aliquots --. Columns 5 and 6 in the table, first column, below the first formula, "Ejample" should read -- Example --. Columns 7 and 8, second table, in t heading to the table, fifth column, the formula should appear a shown below:

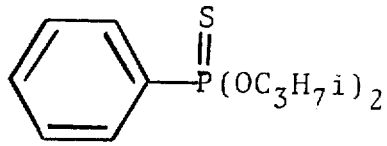

Column 7, line 57, "$n_D^{25}=1.4908$" should read -- $n_D^{25}=1.5177$ --; line 62, "$n_D^{25}=4908$" should read -- $n_D^{25}=1.4908$ --.

Signed and sealed this 10th day of March 1970.

(SEAL)
Attest:

EDWARD M. FLETCHER, JR.
Attesting Officer

WILLIAM E. SCHUYLER, JR.
Commissioner of Patents